Figure 3:
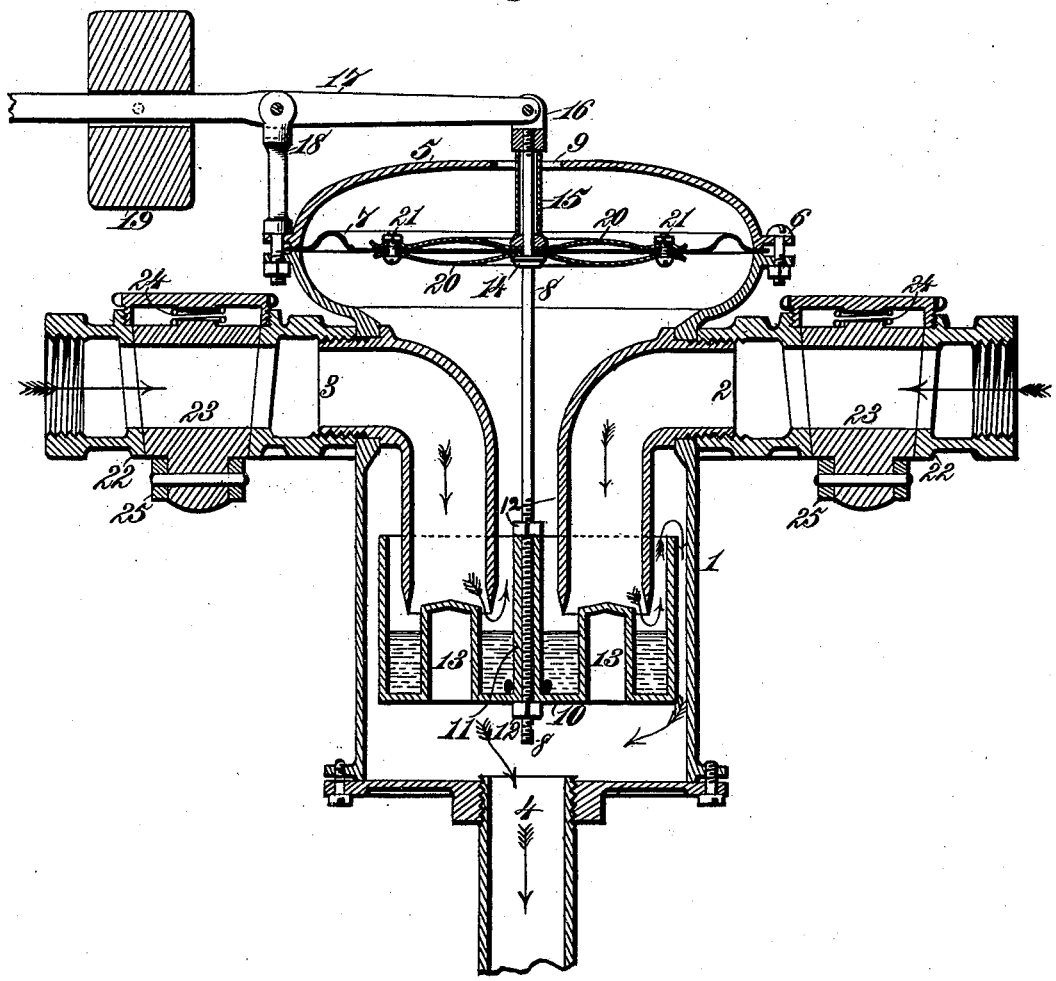

(No Model.) 2 Sheets—Sheet 1.
H. J. BELL.
GAS AND AIR MIXER.
No. 400,177. Patented Mar. 26, 1889.
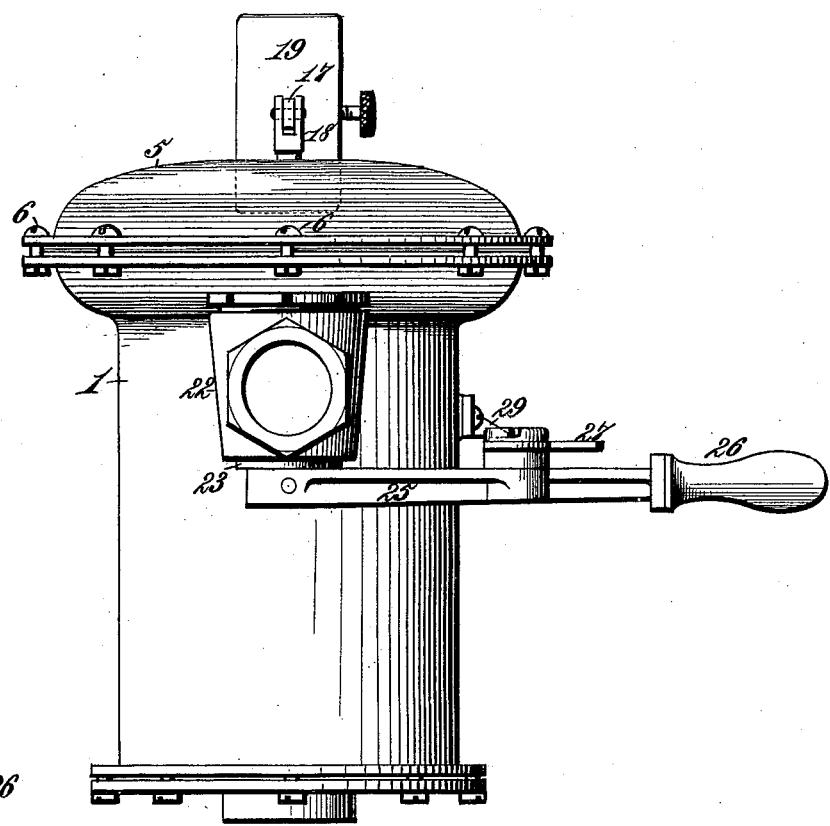
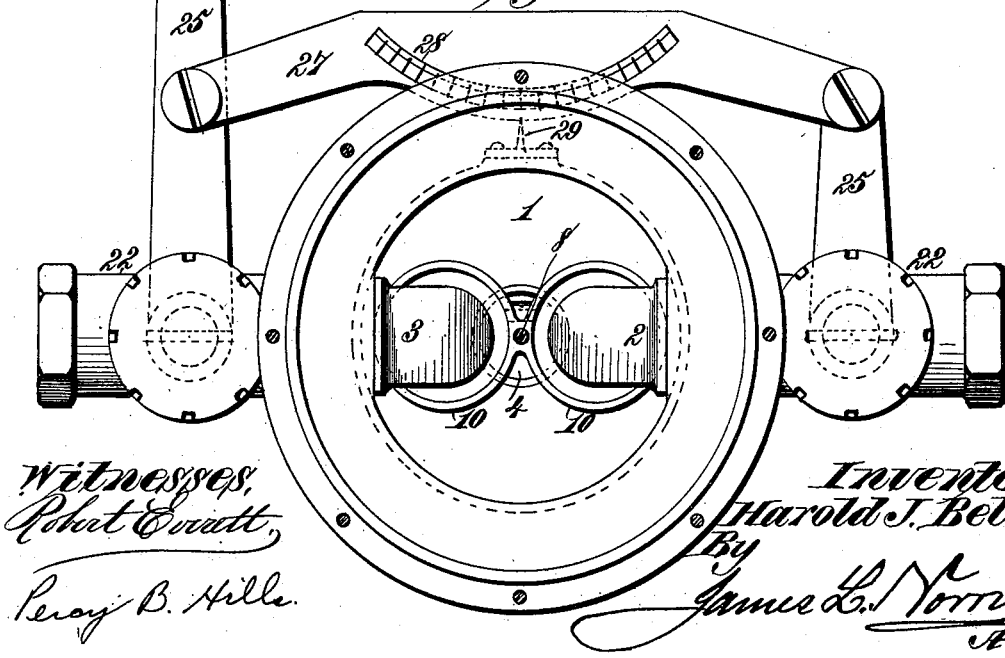
Witnesses:
Robert Everatt
Percy B. Hills
Inventor:
Harold J. Bell
By James L. Norris
Atty.

(No Model.) 2 Sheets—Sheet 2.

H. J. BELL.
GAS AND AIR MIXER.

No. 400,177. Patented Mar. 26, 1889.

Witnesses.
Robert Everett
Percy B. Hills

Inventor:
Harold J. Bell,
By James L. Norris,
Atty.

UNITED STATES PATENT OFFICE.

HAROLD J. BELL, OF GLOUCESTER CITY, NEW JERSEY, ASSIGNOR TO THE WELSBACH INCANDESCENT GAS LIGHT COMPANY, OF NEW JERSEY.

GAS AND AIR MIXER.

SPECIFICATION forming part of Letters Patent No. 400,177, dated March 26, 1889.

Application filed September 6, 1888. Serial No. 284,723. (No model.)

*To all whom it may concern:*

Be it known that I, HAROLD J. BELL, a citizen of the United States, residing at Gloucester City, in the county of Camden and State of New Jersey, have invented new and useful Improvements in Gas and Air Mixing Machines, of which the following is a specification.

This invention relates to a gas and air mixer designed for mixing uncarbureted atmospheric air with carbureted vapor, coal-gas, or with air saturated to a certain degree with the vapors of the lighter oils, such as are employed in the common carburetor or so-called "gasoline-gas" machines, the object being to effect a mixture of gas, carbureted air or vapor, and uncarbureted air in suitable proportions, variable at the will of the consumer, so that the quality of gas can be maintained nearly or quite uniform during the time required for consuming the charge of the carburetor or gas-generator.

In the annexed drawings, illustrating the invention, Figure 1 is an elevation of my improved gas and air mixer. Fig. 2 is a plan of the gas and air mixer. Fig. 3 is a central vertical section of the same.

The numeral 1 designates a gas and air mixing tank having a gas-inlet pipe, 2, and an air-inlet pipe, 3, said pipes being made to enter the tank near the top from opposite sides, and having their inner ends turned downward side by side within the tank, as shown in Fig. 2. The tank 1 also has an outlet or delivery pipe, 4, which may be located at the bottom, as shown, or elsewhere.

The top 5 of the tank is preferably dome-shaped and removable, and is secured to the tank-body by screw-bolts 6, or otherwise. Between the edges of the tank body and top is secured the periphery of a diaphragn, 7, composed of leather or other flexible material. The center of this diaphragm is secured to a vertical valve-rod, 8, which is passed through said diaphragm and through an air-opening, 9, in the top of the tank.

To the lower end of the rod 8 are attached cup-valves 10, which surround the lower ends of the gas and air inlet pipes 2 and 3, and contain mercury to seal said pipes or control the flow of gas and air through them, as regulated by the rise and fall of said valves, in a manner presently explained. The cup-valves 10 are connected, as shown in Figs. 2 and 3, by a tubular stem, 11, which engages the screw-threaded lower end of the valve-rod 8, and nuts 12 are placed on said rod 8 above and below the tubular stem 11, by means of which the cup-valves 10 are adjustably supported in the required position with relation to the lower ends of the gas and air inlet pipes. In order to diminish the quantity of mercury required in the cup-valves vertically-projecting bosses or nipples 13 are located in the bottom of said valves directly opposite the lower open ends of the gas and air inlet pipes.

The valve-rod 8 is provided with a supporting-shoulder, 14, at the point of attachment for the center of the flexible diaphragm 7, and the valve-rod is surrounded above the diaphragm by a sleeve, 15, which serves to hold the diaphragm down onto said shoulder. The sleeve 15 is connected by the valve-rod 8 to a bifurcated block, 16, which has a screw-threaded connection with the upper end of the valve-rod, and to this block 16 is pivoted a balance-arm, 17, which is fulcrumed to a lug, 18, on the tank-top. The balance-arm 17 carries an adjustable weight, 19, by which the valve 10 can be adjusted to the desired pressure of gas. The flexible diaphragm 7 is strengthened at the center by metal disks 20, one above and one below, which are secured to the flexible material by small screw-bolts 21, or in any suitable manner. The varying pressure of gas on the under side of this diaphragm actuates the valve 10 through the rod 8, and so maintains a practically uniform pressure of gas during the time the mixer is in use.

The gas-inlet pipe 2 and air-inlet pipe 3 are provided outside the tank with valve-casings 22, in which are located conical plug-valves 23, which are held to their seats by means of springs 24, bearing in the upper enlarged ends of said valves. The lower ends of these plug-valves project beyond the valve-casings for attachment of arms 25, one of which is provided with a handle, 26, and serves as a hand-lever. The arms 25 are connected by a link, 27, to which is attached a segmental scale, 28, which coacts with a stationary pointer or index-finger, 29, that is fixed to the outside of the tank, thus indicating the proportionate quantity of air and gas at different times, as determined by the position of the plug-valves. Said plug-valves are so constructed and arranged that when the lever-handle 26 is turned to the right or left, as the case may be, one valve will be opened to the same extent that the other is closed, thereby controlling the relative proportions of gas and air admitted into the machine.

It will be seen that this machine provides a simple and reliable means of automatically regulating the pressure of the gas and of controlling its density, richness, and photometric quality from time to time, as required.

The gas or vapor producer and air-pump with which the gas and air mixer is to be used may be of any well-known kind and need not be illustrated or described.

What I claim as my invention is—

1. In a gas and air mixing machine, the combination, with a tank having gas and air inlet pipes projecting downwardly within said tank, of cup-valves suspended beneath the open ends of said pipes and containing mercury, a vertical valve-rod attached to said valves and projecting through an air-opening in the top of the tank, a flexible diaphragm located in the upper part of the tank and centrally attached to the said valve-rod, and a balance-arm fulcrumed above the tank in pivotal connection with the valve-rod and carrying an adjustable weight, substantially as described.

2. In a gas and air mixing machine, the combination, with a tank having gas and air inlet pipes, and valve-casings communicating with said pipes, of valve-plugs located in said casings, arms attached to said valve-plugs, one of said arms being provided with a hand-lever, a link connecting said arms, a scale on said link, and a stationary index finger or pointer, substantially as described.

In testimony whereof I affix my signature in presence of two witnesses.

H. J. BELL.

Witnesses:
HARRY E. BANCROFT,
CHAS. H. WASHBURN.